(12) United States Patent
Wolosewicz

(10) Patent No.: US 11,711,394 B2
(45) Date of Patent: Jul. 25, 2023

(54) SYSTEM FOR MANAGING IOT DEVICES

(71) Applicant: Cyberus Labs sp. z o.o., San Francisco, CA (US)

(72) Inventor: Jack Wolosewicz, San Francisco, CA (US)

(73) Assignee: Cyberus Labs sp. z o.o.

( * ) Notice: Subject to any disclaimer, the term of this patent is extended or adjusted under 35 U.S.C. 154(b) by 94 days.

(21) Appl. No.: 17/334,799

(22) Filed: May 31, 2021

(65) Prior Publication Data

US 2022/0191240 A1 Jun. 16, 2022

Related U.S. Application Data

(60) Provisional application No. 63/032,398, filed on May 29, 2020.

(51) Int. Cl.
*H04L 29/06* (2006.01)
*G06N 5/02* (2023.01)
*H04L 9/40* (2022.01)
*G06N 5/022* (2023.01)
*G16Y 30/10* (2020.01)

(52) U.S. Cl.
CPC ......... *H04L 63/1441* (2013.01); *G06N 5/022* (2013.01); *H04L 63/1416* (2013.01); *G16Y 30/10* (2020.01)

(58) Field of Classification Search
CPC . H04L 63/1441; H04L 63/1416; G06N 5/022; G16Y 30/10
See application file for complete search history.

(56) References Cited

U.S. PATENT DOCUMENTS

| | | | |
|---|---|---|---|
| 10,528,725 B2* | 1/2020 | Samuel | H04L 67/12 |
| 11,050,763 B1* | 6/2021 | Lyle | H04L 63/126 |
| 2016/0182538 A1* | 6/2016 | Teddy | H04W 12/122 |
| | | | 726/23 |
| 2017/0126525 A1* | 5/2017 | Coates | H04L 67/02 |
| 2017/0171180 A1* | 6/2017 | Britt | G06F 16/9554 |
| 2017/0264511 A1* | 9/2017 | Myadam | G06F 16/22 |
| 2018/0364135 A1* | 12/2018 | Eriksson | H04L 12/2823 |
| 2019/0190939 A1* | 6/2019 | Cheng | H04L 41/069 |
| 2019/0349190 A1 | 11/2019 | Smith et al. | |
| 2020/0210313 A1 | 7/2020 | Degaonkar et al. | |
| 2020/0213360 A1* | 7/2020 | Ojha | H04W 12/63 |
| 2020/0358853 A1 | 11/2020 | Thummalapalli et al. | |

OTHER PUBLICATIONS

International Search Report and Written Opinion of the International Searching Authority re PCT/US22/30731.

* cited by examiner

*Primary Examiner* — Kambiz Zand
*Assistant Examiner* — Afaq Ali
(74) *Attorney, Agent, or Firm* — Soody Tronson; STLG Law Firm

(57) ABSTRACT

Briefly, systems and methods for managing Internet of Things (IoT) devices provide platforms featuring an architecture for user and device authentication as well as IoT system self-healing.

13 Claims, 4 Drawing Sheets

SYSTEM FOR MANAGING IOT DEVICES

FIELD OF INVENTION

Embodiments of the present invention relate to managing IoT devices using device vendor information and AI analytics.

BACKGROUND

Internet of Things (IoT) devices are proliferating in society. These devices generally have specific functionality and limited processing power. In many instances, the processing power is not sufficient to support security or maintenance applications. As such, IoT devices are particularly vulnerable to cyber-attaches. In addition, maintenance and replacement of IoT devices may be delayed or altogether missed because IoT device owners and IoT device vendors cannot easily communicate with one another. Limited communication between owners and vendors may occur for a variety of reasons including, for example, security implementations that limit or exclude data gathering from entities outside of the system owner's IoT network.

As such, systems for managing IoT devices are presented herein.

SUMMARY

Systems and methods for using the same are disclosed for managing Internet of Things (IoT) devices in accordance with embodiments of the present invention. In particular, embodiments presented provide platforms featuring an architecture for user and device authentication as well as IoT system self-healing. In an embodiment the system for managing Internet of Things (IoT) devices comprises a plurality of IoT devices operable by a user; a hub for electronically coupling the plurality of IoT devices to the user; an IOT server for electronically coupling the plurality of IoT devices with a plurality of IoT vendors; a plurality of application programming interfaces (API) for enabling data sharing between the plurality of IoT vendors and the plurality of IoT devices; and a plurality of dashboard graphical user interfaces (GUI) for enabling communication between the plurality of IoT vendors and the user, wherein the IoT server enables the plurality of APIs.

DETAILED DESCRIPTION

Figure 1:
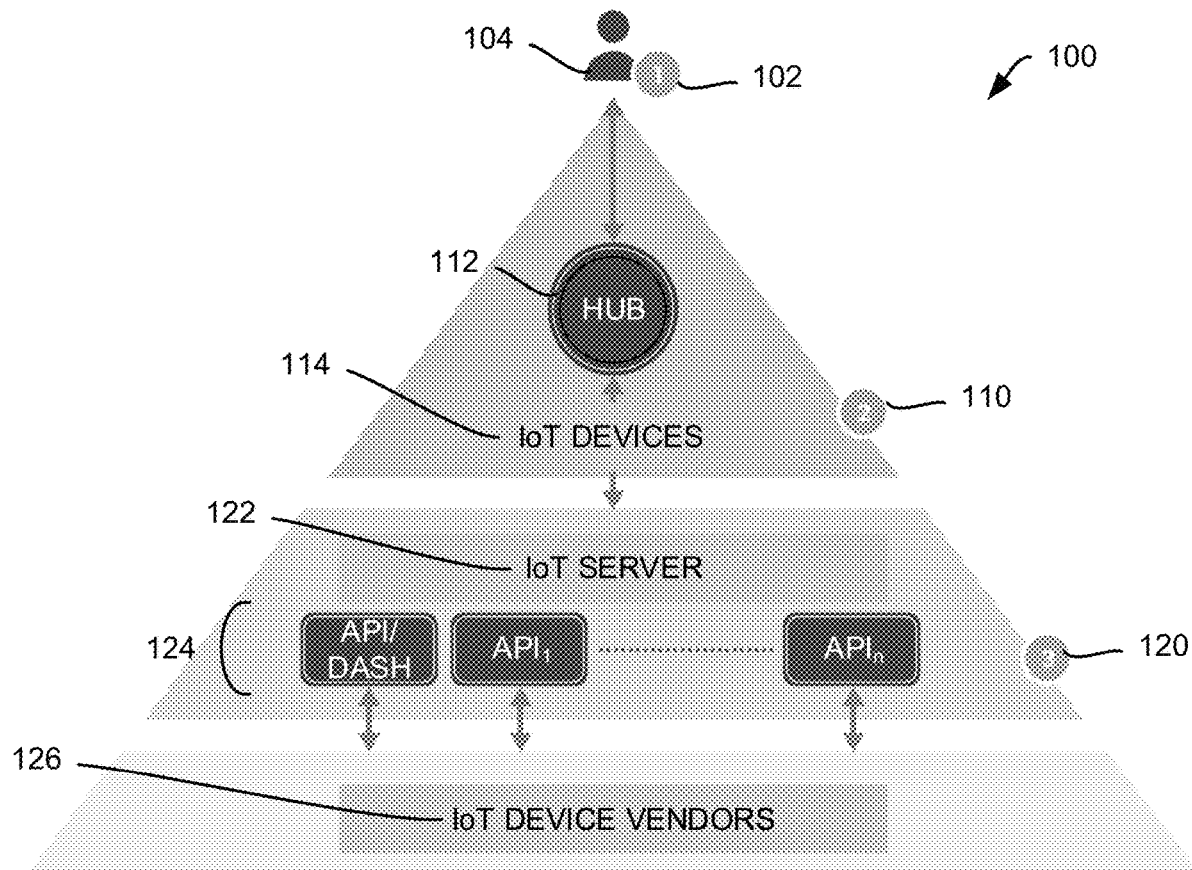
FIG. 1 is an illustrative representation of a system for managing IoT devices in accordance with embodiments of the present invention.

Embodiments of the present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

As will be appreciated by one skilled in the art, the present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals /per se/, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is an illustrative representation of a system 100 for managing Internet of Things (IoT) devices in accordance with embodiments of the present invention. In particular, embodiments presented provide platforms featuring an architecture for user and device authentication as well as IoT system self-healing. As illustrated, system 100 includes: human-to-machine (H2M) authentication layer 102; machine-to-machine (M2M) encryption and authentication layer 110; and self-healing layer 120. In embodiments, user 104 may access a variety of user IoT devices 114 via hub 112. H2M authentication layer embodiments include: smartphone-based login using ultra-sound and ready for voice-activated IoT hubs that provide no user credentials for hackers to steal and prevent phishing or man-in-the-middle attacks. In further embodiments, user IoT devices 114 are in communication with IoT server 122, which in turn is enabled with a variety of application program interfaces 124 that provide communication between users and IoT vendors 126. M2M encryption and authentication layer embodiments include: minimum computation IoT cypher that authenticates and protects simple end-point devices and data. In addition, self-healing layer embodiments include predictive Artificial Intelligence (AI) analytics to detect anomalous behavior and anticipate device/system failure, which will be discussed in further detail below for FIG. 2.

Figure 2:
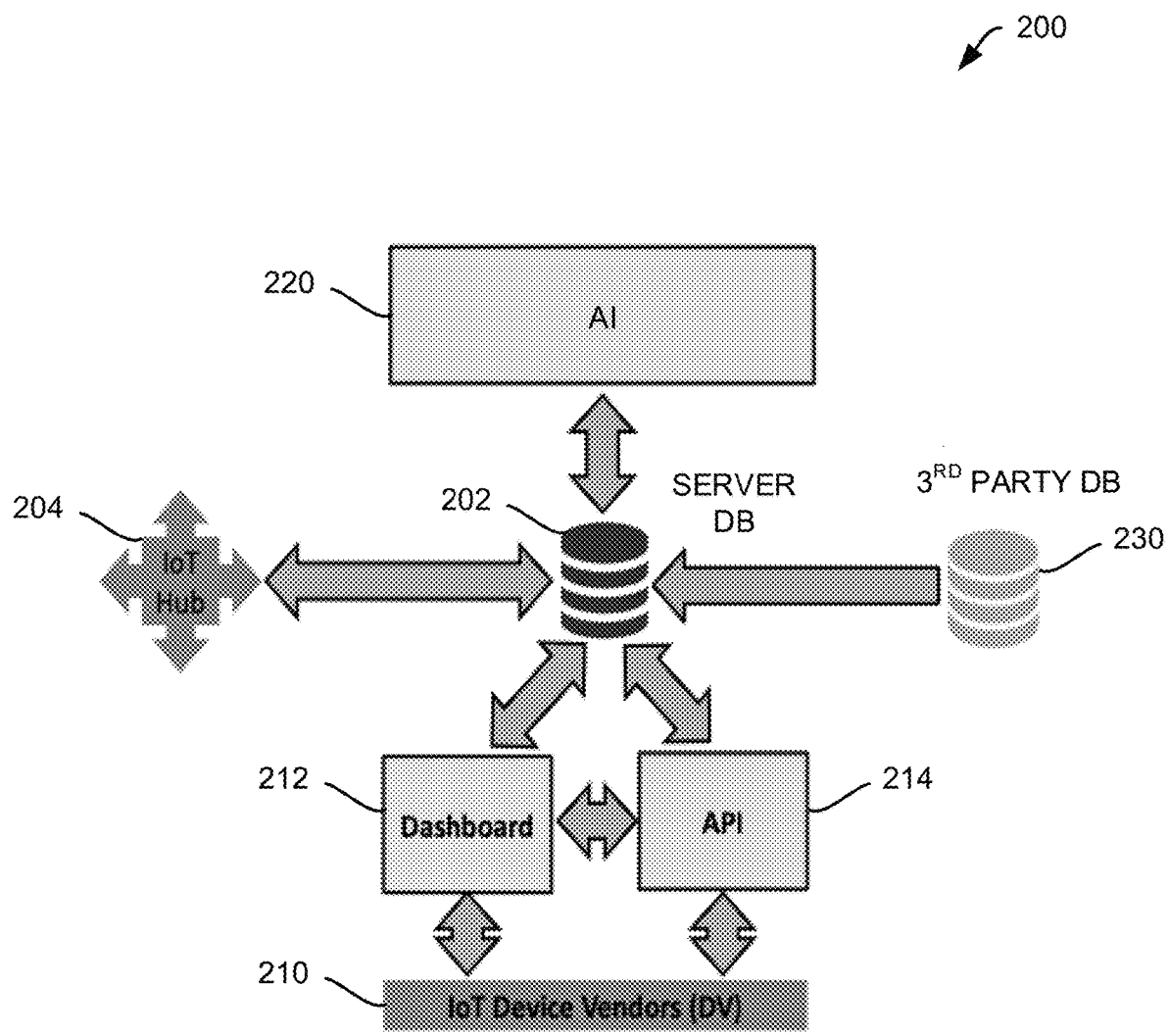
FIG. 2 is an illustrative representation of a self-healing layer for managing IoT devices in accordance with embodiments of the present invention.

FIG. 2 is an illustrative representation of a self-healing layer 200 for managing IoT devices in accordance with embodiments of the present invention. In particular, FIG. 2 further illustrates self-healing layer as illustrated in FIG. 1, 120. In general, self-healing layer embodiments allow an IoT system to predict, identify and remedy system failures due to a cyberattack, due to a communications failure, or due to physical failures of some of IoT components. As illustrated, server database 202 provides a data repository for system 200 as enabled by an IoT server (see 122, FIG. 1). Relevant data may be retrieved and sent to a variety of entities including IoT hub 204, IoT device vendors 210, $3^{rd}$ party sources 230, and an AI engine 220. Communication is facilitated between IoT device vendors and IoT device owners via dashboard 212 and API 214.

In embodiments, the self-healing layer 200 may be thought of as a data analytics layer, which includes a rules engine and flight envelope parameters, an AI engine 220 for predictive analytics and anomaly detection, and any number of IoT device vendor interface APIs. The rules engine and flight envelope parameters allow the system to monitor device outputs or inputs to determine if they are within a safe operating range. In embodiments, a rules engine receives data from all connected devices and runs the data against the IoT device operating limits. The rules engine then applies rules specified by the system owner or user to control the IoT system and to evaluate system state and health. In some embodiments, the rules engine alerts a system owner if a device is operating outside of normal parameters. This may be part of an AI decision to replace a device pre-failure or just alert the system owner. The rules engine can also shut down devices which are behaving erroneously.

In general, the rules engine is based on a flight-envelope-limit or operational parameters. In aviation, the term flight envelope refers collectively to the operating parameters and capabilities of a specific model or type of aircraft. The various parameters that make up a flight envelope include the aircraft's maximum altitude, maximum and minimum speed, the maximum amount of g-forces the craft can withstand, climb rate, glide ratio and other factors that define the aircraft's flight characteristics. Just like aircraft, IoT ecosystems and devices also need flight envelopes—predefined operating and performance parameters. Any device performing outside of these is an indication that the device is either 1) failing/has failed or 2) the device has been hacked. A device operating within the flight envelope parameters is considered normal. In embodiments, the flight envelope includes at least two sets of "not to exceed" parameters. One is a maximum operating range parameter, the other is a pre-settable operating range parameter which a user may want to mandate for a particular device. In embodiments, if flight envelope parameters are exceeded, the rules engine can activate a particular system reaction, which will depend on operator settable rules.

The AI engine 220 for predictive analytics and anomaly detection is part of the self-healing mechanism, which can predict IoT device failure in the system based on Meantime Between Failure (MTBF) statistics provided by IoT device vendors. Anomaly detection monitors system activity data to detect anomalous behavior and potential hacks as well as identifying other system failure modes. System specific failure modes can be determined by machine learning algorithms informed by extended observations of system data. In embodiments, AI engines include machine learning which can establish a baseline of a system owner's IoT system behavioral pattern and detect abnormal system behavior. The AI can then attempt to match the detected abnormal system behavior to known cyberattack patterns. The AI may then take actions to remediate the damage done by an identified cyberattack.

IoT device vendor interface APIs 214 are portals to IoT device vendor databases which include IoT device characteristics and MTBF data to be utilized by the AI engine for predictive analytics operations. These APIs 214 are supported by dashboards 212 allowing IoT System Owners (SO) and IoT Device Vendors (DV) 210 to interact to keep IoT systems operational and to request a variety of data and services from each other. MTBF data is one example embodiments, but DVs can also request actual field operations data from SOs to refine their MTBF numbers and even to monitor real time system performance. The same interface is able to process an upgrade, purchase a replacement, or a service as may be needed. This creates a relationship between SOs and DVs with aligned interests to keep IoT systems operating reliably. In effect, both parties have a stake in each other's success. The vendor MTBF Interface API and dashboard UI diagram are discussed in further detail below for FIGS. 3 and 4.

Figure 3:
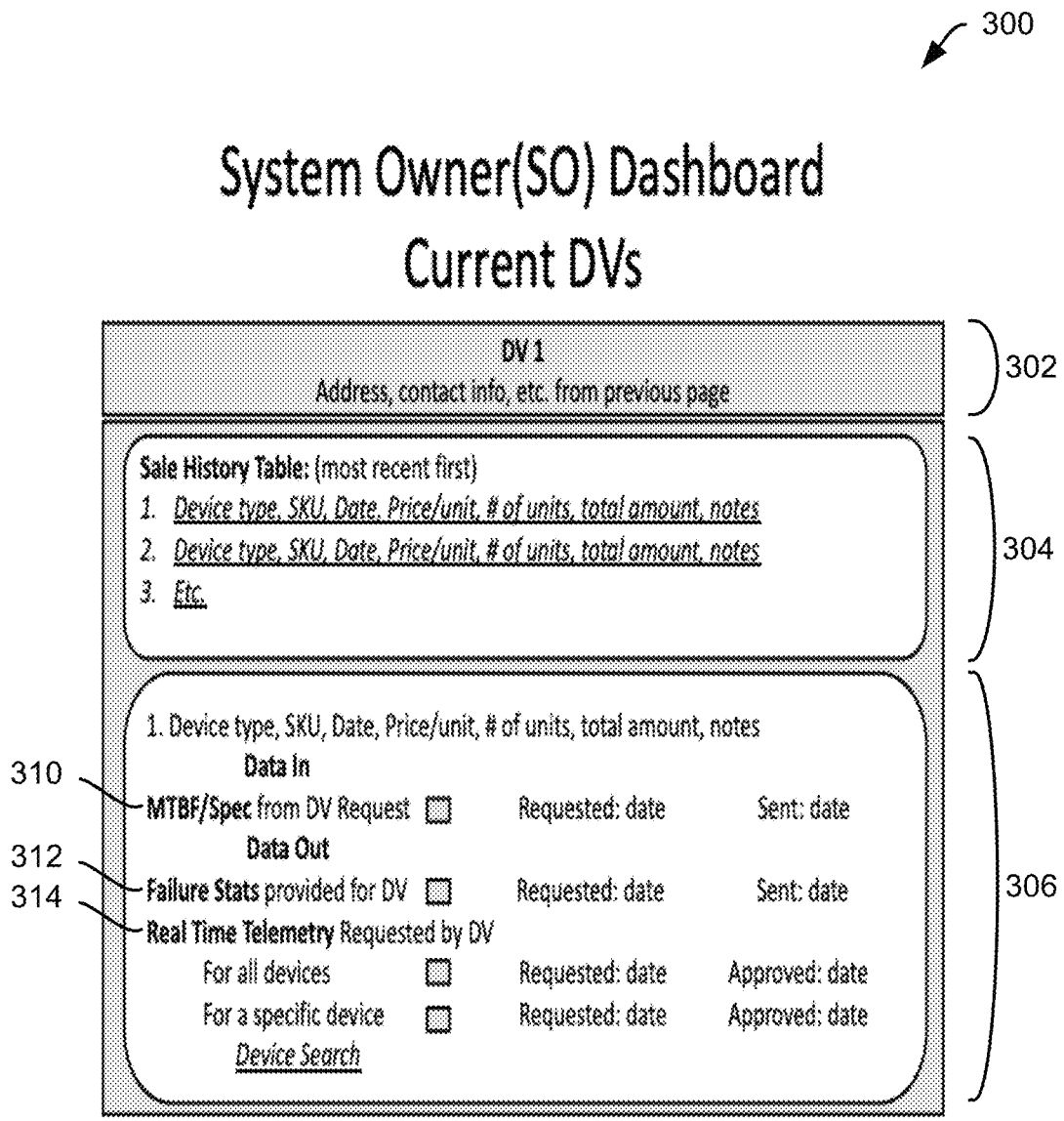
FIG. 3 is an illustrative representation of a system owner dashboard utilized in a system for managing IoT devices in accordance with embodiments of the present invention.

FIG. 3 is an illustrative representation of a system owner dashboard 300 utilized in a system for managing IoT devices in accordance with embodiments of the present invention. In general, a dashboard, as contemplated herein, is a set of intuitive screens through which the SO can interact with the IoT hub using a web browser. A dashboard further allows the SO to monitor current IoT network state and manage rules in the flight envelope. Dashboard embodiments display device performance and operational limits that the device should not go over including one provided by the device manufacturer which if exceeded, will damage the device. As noted above, API embodiments are supported by dashboards that allow IoT SOs and IoT DVs to interact to keep IoT systems operational and to request a variety of data and services from each other. SO dashboard embodiments illustrated include any number of sections including, for example: device information section 302, device sale history table 304 and device data request section 306. In embodiments, device data requests may include MTBF data request 310, failure statistics request 312, and real-time telemetry request 314. Other data requests may be included without limitation and without departing from embodiments provided herein. These data requests provide data to an AI engine for predictive analytics operations as disclosed herein. In addition, API also includes an IoT marketplace through which an SO can purchase replacement devices from a DV (any device vendor) once AI makes the decision to replace.

Figure 4:
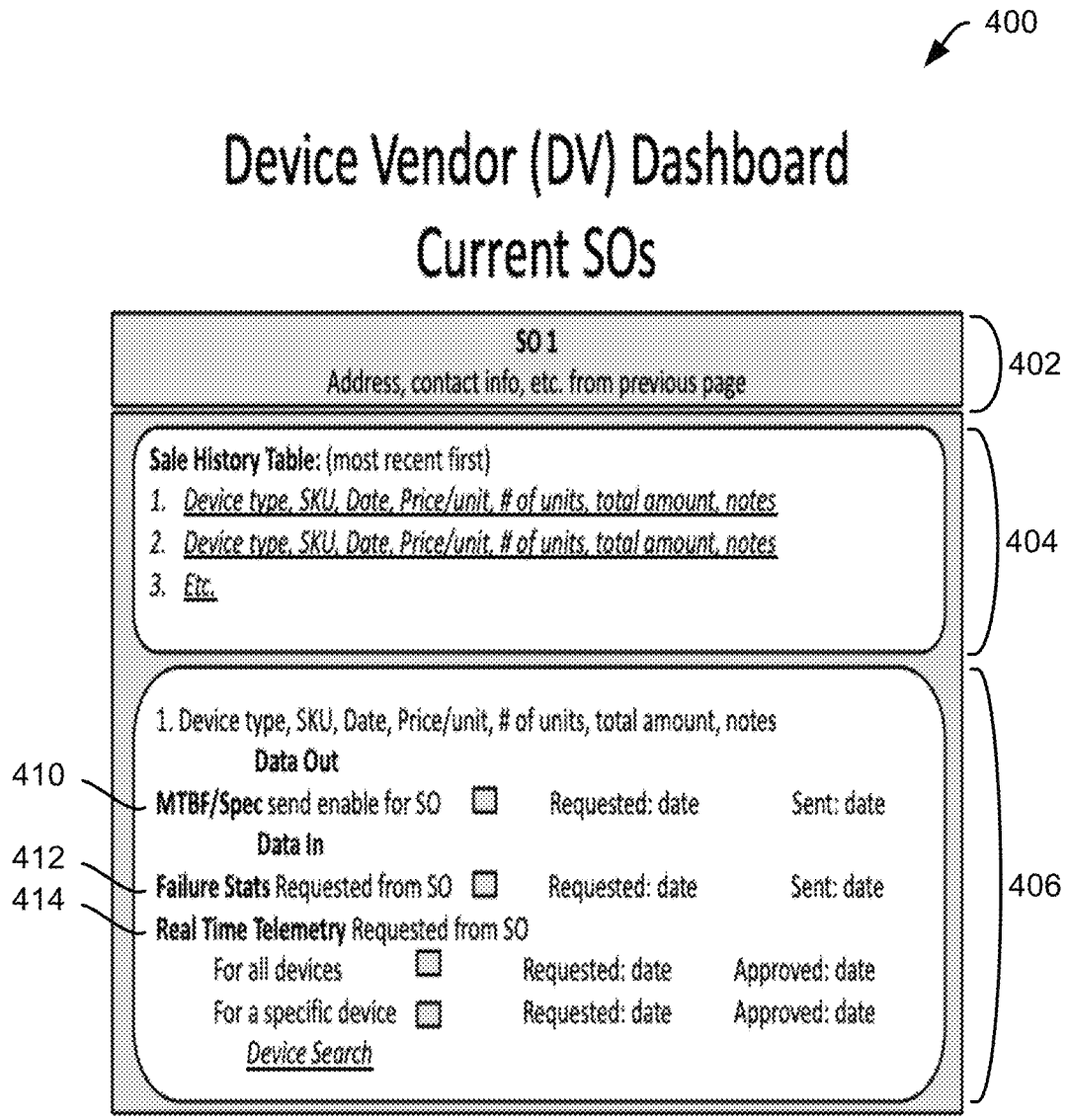
FIG. 4 is an illustrative representation of a device owner dashboard utilized in a system for managing IoT devices in accordance with embodiments of the present invention.

FIG. 4 is an illustrative representation of a device vendor dashboard 400 utilized in a system for managing IoT devices in accordance with embodiments of the present invention. As noted above, API embodiments are supported by dashboards that allow IoT SOs and IoT DVs to interact to keep IoT systems operational and to request a variety of data and services from each other. DV dashboard embodiments illustrated include any number of sections including, for example: system owner information section 402, device sale history table 404 and device data request section 406. In embodiments, device data requests may include MTBF data request 410, failure statistics 412, and real-time telemetry 414. The API also acts as a secure contact point between SO and DV, which allows the DV to update/patch their devices in the field to be in compliance with current IoT laws and directives requiring this type of maintenance.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

While this invention has been described in terms of several embodiments, there are alterations, permutations, and equivalents, which fall within the scope of this invention. It should also be noted that there are many alternative ways of implementing the methods, computer program products, and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A method for self-healing a plurality of Internet of Things (IoT) devices in an IoT system, the method comprising:
providing the IoT system, the IoT system comprising:
the plurality of IoT devices operable by a user;

a hub for electronically coupling the plurality of IoT devices to the user;

an IoT server for electronically coupling the plurality of IoT devices with a plurality of IoT vendors;

a plurality of application programming interfaces (APIs) for enabling data sharing between the plurality of IoT vendors and the plurality of IoT devices; and a plurality of dashboard graphical user interfaces (GUIs) for enabling communication between the plurality of IoT vendors and the user, wherein the IoT server enables the plurality of APIs, wherein the plurality of dashboard GUIs comprises: a user dashboard for retrieving IoT device information and for enabling data sharing with the plurality of IoT vendors, and wherein the user dashboard comprises:
a plurality of sections comprising:
an IoT device information section;
an IoT device sale history table; and
an IoT device data request section, wherein the IoT device data request section includes a mean time before failure (MTBF) data request, a failure statistics request, and a real-time telemetry request;

establishing a baseline of the IoT system behavioral patterns by an IoT server;

detecting abnormal system behavior based on the baseline;

matching the detected abnormal system behavior to any of a plurality of known cyberattack patterns; and remediating any damage done that corresponds with any of the matching known cyberattack patterns.

2. The method of claim 1, further comprising:
causing the IoT server to receive a plurality of flight envelope parameters corresponding with the plurality of IoT devices from a plurality of IoT vendors and from a user of the plurality of IoT devices;
determining whether any of the plurality of IoT devices are performing outside of the plurality of flight envelope parameters;
if any of the plurality of flight envelope parameters are exceeded, activating a system reaction by a rules engine, wherein the system reaction corresponds with a plurality of operator settable rules.

3. The method of claim 2, wherein the flight envelope parameters comprise at least:
a maximum operating range parameter for each IoT device provided by the plurality of IoT vendors; and
a pre-settable operating range parameter for each IoT device provided by the user.

4. The method of claim 1, further comprising:
performing predictive analytics and anomaly detection to predict IoT device failure in the system based on MTBF statistics provided by the plurality of IoT device vendors.

5. A system for managing Internet of Things (IoT) devices comprising:
a plurality of IoT devices operable by a user;
a hub for electronically coupling the plurality of IoT devices to the user;

an IoT server for electronically coupling the plurality of IoT devices with a plurality of IoT vendors;

a plurality of application programming interfaces (API) for enabling data sharing between the plurality of IoT vendors and the plurality of IoT devices; and a plurality of dashboard graphical user interfaces (GUIs) for enabling communication between the plurality of IoT vendors and the user, wherein the IoT server enables the plurality of APIs, wherein the plurality of dashboard GUIs comprises: a user dashboard for retrieving IoT device information and for enabling data sharing with the plurality of IoT vendors, and wherein the user dashboard comprises:
a plurality of sections comprising:
an IoT device information section;
an IoT device sale history table; and
an IoT device data request section, wherein the IoT device data request section includes a mean time before failure (MTBF) data request, a failure statistics request, and a real-time telemetry request.

6. The system of claim 5, wherein the IoT server further comprises:
a server repository for storing flight envelope parameters associated with the plurality of IoT devices as provided by the plurality of IoT vendors; and
an artificial intelligence (AI) engine for performing predictive analytics and anomaly detection to predict IoT device failure in the system based on Meantime Between Failure (MTBF) statistics provided by the plurality of IoT device vendors.

7. The system of claim 6, wherein the IoT server further comprises an IoT hub.

8. The system of claim 6, wherein the flight envelope parameters comprise at least:
a maximum operating range parameter for each IoT device provided by the plurality of IoT vendors; and
a pre-settable operating range parameter for each IoT device j provided by the user.

9. The system of claim 6, wherein the AI engine comprises a rules engine having a machine learning function to establish a baseline of the user's IoT devices behavioral pattern and to detect abnormal system behavior corresponding with a cyberattack pattern.

10. The system of claim 6, wherein the plurality of APIs comprises:
an IoT marketplace function through which the user purchases a replacement IoT device from any of the plurality of IoT vendors based on an analysis of the AI engine.

11. The system of claim 5, wherein the plurality of IoT vendors comprise a plurality of IoT device vendors and a plurality of 3rd party sources.

12. The system of claim 5, wherein the hub is voice-activated.

13. The system of claim 5, wherein the plurality of dashboard graphical user interfaces further comprises:
an IoT vendor dashboard for retrieving and sharing data corresponding with the data sharing enabled by the user.

* * * * *